United States Patent [19]

Emmons et al.

[11] 4,234,711

[45] Nov. 18, 1980

[54] ANAEROBIC ADHESIVE AND/OR SEALING COMPOSITIONS COMPRISING DICYCLOPENTENYLOXYETHYL (METH)ACRYLATES

[75] Inventors: William D. Emmons, Huntingdon Valley; Vincent J. Moser, Hatboro, both of Pa.

[73] Assignee: Rohm and Haas Company, Philadelphia, Pa.

[21] Appl. No.: 932,256

[22] Filed: Aug. 9, 1978

[51] Int. Cl.$^3$ .......................... C08F 4/34; C09D 3/80; C08F 236/00
[52] U.S. Cl. ................ 526/282; 206/524.1; 427/301; 427/350; 427/388.1; 526/204; 526/209; 526/211; 526/217; 526/230; 526/232.1; 428/463; 156/332
[58] Field of Search ............... 526/230, 204, 283, 282, 526/833

[56] References Cited

U.S. PATENT DOCUMENTS

| | | | |
|---|---|---|---|
| 3,642,750 | 2/1972 | Wegemond et al. | 526/227 |
| 4,048,259 | 9/1977 | Wegemond et al. | 526/230 |
| 4,071,489 | 1/1978 | Emmons et al. | 526/282 |
| 4,097,677 | 6/1978 | Emmons et al. | 260/29.6 ME |
| 4,100,133 | 7/1978 | Emmons et al. | 260/45.9 L |

OTHER PUBLICATIONS

Organic Peroxides, vol. 1, Swern Ed., Wiley Intersci., pp. 81-87, Table 20, Half-Life 10HR.

*Primary Examiner*—Joseph L. Schofer
*Assistant Examiner*—Herbert J. Lilling
*Attorney, Agent, or Firm*—Lester E. Johnson

[57] ABSTRACT

This invention relates to liquid adhesive and/or sealing compositions capable of hardening or curing under exclusion of oxygen comprising dicyclopentenyloxyethyl acrylate and/or methacrylate and an organic peroxy compound having 3 to 18 carbon atoms selected from the group consisting of organic peroxides and organic hydroperoxides, preferably the latter, and an imide or amine accelerator.

10 Claims, No Drawings

ANAEROBIC ADHESIVE AND/OR SEALING COMPOSITIONS COMPRISING DICYCLOPENTENYLOXYETHYL (METH)ACRYLATES

BACKGROUND OF THE INVENTION

Adhesives are playing a progressively more important role in the production and maintenance portions of today's industry. As used herein, "adhesive" frequently refers not only to high strength bonding materials including rapid-fixturing structural adhesives, but also to related materials which serve primarily to seal or lock the joint between adjacent surfaces (such as threadlocking compounds for nuts and bolts) where comparatively low adhesion is adequate. One of the most important types of adhesives, particularly to the metal-working industry, is the class of anaerobic adhesives. These are adhesives which remain liquid in the presence of air (oxygen) but which polymerize upon the exclusion of air to form hard, durable resins with excellent adhesive properties. Since air is automatically excluded between mating surfaces of metal and other non-porous parts, these adhesives are particularly useful in applications involving non-porous materials.

As with other adhesive materials, anaerobics conventionally are applied in the liquid state to allow the adhesive to contact and "wet" the surfaces to be bonded.

Numerous United States patents have been issued on various anaerobic systems and aerobically-curing compositions. Frauenglass et al U.S. Pat. No. 3,757,828, Sept. 11, 1973 in column 4, lines 25–35, refers to several such patents, but none of these patents disclose or suggest the anaerobic compositions of the present invention.

Wegemund et al, U.S. Pat. No. 3,642,750, Feb. 15, 1972 discloses anaerobic adhesive or sealant compositions which comprise liquid polymerizable esters of acrylic acid or methacrylic acid with 5,6-dihydrodicyclopentadienol; see column 2, lines 23 to 25, in the general description of the invention starting in line 15 of column 2, Examples I through VI, and claim 1 (column 6, lines 41–49) of the patent. The acrylate or methacrylate of 5,6-dihydrodicyclopentadienol, when used to seal or adhere the mating threaded surfaces of a bolt-nut assemblage or the unthreaded mating surfaces of close-fitting bearing rings joined to a shaft therein, manifested improved stability to heat. However, anaerobic adhesive compositions containing the aforesaid acrylate or methacrylate, in spite of their relatively high boiling points, have an odor that is quite characteristic, pervasive, persistent, and objectionable under certain conditions when put into use by certain operative personnel. Furthermore, these esters form seals and bonds which are extremely hard and brittle and subject to rupture on shock unless mixed with other copolymerizable monomers which can serve to soften or toughen the seal.

DESCRIPTION OF THE INVENTION

For purposes of simplification herein, the designation (meth)acrylic acid is intended to refer to either acrylic acid or methacrylic acid and also generically to both. Similarly, (meth)acrylate, if and when used in the specification and claims herein, is intended to generically refer to an "acrylate" and a "methacrylate".

In accordance with the invention, improved anaerobic adhesive and/or sealant compositions are obtained by mixing:

(a) At least one ester-ether of Formula I, namely a (meth)acrylate of a mono-ether of ethylene glycol from dicyclopentadiene, following:

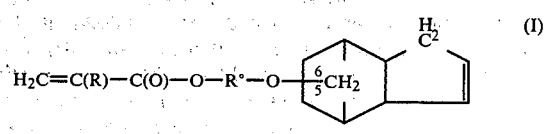

wherein R is H or CH$_3$, and R° is ethylene, (b) 0 to 0.1% by weight of a polymerization inhibitor, (c) 0.1% to 20% by weight of an organic percompound having 3 to 18 carbon atoms selected from organic peroxides which are half decomposed after 10 hours at temperatures higher than 90° C. and organic hydroperoxides, (d) 0 to 5% by weight of an accelerator, such as a tertiary amine or an imide, and (e) 0 to 15% by weight, preferably 5 to 12% by weight, of an adhesion-enhancer, based on the weight of component (a).

The compositions may consist essentially of the components (a), (b), (c), and (d) above, the monomer (a) being the main component in terms of weight percentage, the other percentages being based on the total amount of (a), (b), (c) and (d). Thus the proportion of (a) may range from about 75 to 99.9% by weight of these four components. Alternatively, the compositions may consist essentially of the components (a), (c), and (e) optionally with (b) and/or (d).

The ester-ethers of Formula I above can be made by the procedures disclosed in copending U.S. Patent application Ser. No. 703,348, filed July 7, 1976, now U.S. Pat. No. 4,097,677, issued June 27, 1978 in the hands of a common assignee. The ester-ether chain may be connected to either the 5-position or the 6-position of the ring nucleus as indicated in the general Formula I. In fact the product may comprise a mixture of the two compounds in one of which the ester-ether chain is substituted in the 5-position and in the other of which the ester-ether chain is substituted in the 6-position.

Any suitable known polymerization inhibitor, may serve as component (b), such as hydroquinone, and methyl ethers of hydroquinone, the amount, if used, being from 0.001% to about 0.1% by weight.

For the preparation of the mixtures of the invention, organic peroxides or hydroperoxides may be used which are derived from hydrocarbons which contain from about 3 to 18 carbon atoms. For example, suitable organic hydroperoxides are: tertiary butyl hydroperoxide, cumene hydroperoxide, methylethylketone hydroperoxide, diisopropylbenzene hydroperoxide, etc. The organic hydroperoxides should be present in an amount of 0.1% to about 20%, preferably from 0.5% to 10% based on the total mixture. The mixture may also contain, either alone or in combination with the organic hydroperoxides, those organic peroxides which are half decomposed after 10 hours at temperatures which are higher than 85° C. to 90° C. Suitable organic peroxides include tertiary-butyl perbenzoate, 2,2-bis(tert-butylperoxy)butane, bis-(1-hydroxy-cyclo-hexyl)peroxide, tert-butylperoxy-isopropyl carbonate, etc. The organic peroxides are utilized in the amounts similar to the organic hydroperoxides.

Suitable accelerators are, for example, aliphatic or aromatic tertiary amines, for example trialkylamines, such as triethylamine, tributylamine, dialkylphenylamines such as dimethylaniline, p-dimethyltoluidine, sulphenamides such as N-diethyl-2-benzothiazylsulphenamide or N-methyl-N-cyclohexyl-benzothiazylsulphenamide, sulphimides such as benzoic acid sulphimide. The accelerators are generally added in small quantities of about 0.1 to 5%. Of course, the mixtures of the invention can be free of added stabilizers or accelerators; therefore, the mixtures of the invention can contain from 0 to 0.1% of stabilizers by weight and from 0 to 5% of accelerators by weight.

Thickeners, inorganic fillers, reinforcing resins, and dyestuffs may be added to the compositions to adjust viscosity, or to modify the mechanical and/or optical properties. Suitable thickeners are polymeric compounds such as polymethyl methacrylate, polyethyl acrylate, polymethyl acrylate, polystyrene, polyvinyl chloride, synthetic rubber and the like. Suitable fillers are, for example, finely divided silicon dioxide, silicates, bentonites, calcium carbonate or titanium dioxide. Examples of resins are the polyesters, especially alkyd resins. The thickeners and/or fillers may be added in amounts of from about 0 to about 20% by weight. The amount of polyester or alkyd used may be up to 50% by weight of Formula I monomer used.

The mixtures according to the invention have an excellent stability against polymerization when exposed to the air or in the presence of small amounts of oxygen.

Polymerizable acids, such as beta-acryloxypropionic acid and its methacryloxy analog may be added in amounts up to about 15% by weight of component (a) to enhance the adhesive bond obtained. See U.S. Pat. No. 4,048,259.

While a plasticizer may be added in an amount from about 5 to 15% by weight of the total composition, one of the advantages of the compositions of the present invention is the toughening imparted by the R° group in the compounds of Formula I, wherein R° is specifically defined as ethylene, being derived from ethylene glycol. Instead of the specific use of the 2-carbon atom ethylene group, further modification of the brittleness may be effected favorably by replacing R° with an alkylene group having 3 to 12, preferably not over 4 carbon atoms, or with an oxaalkylene group having 4 to 12 carbon atoms and having one or more oxygen atoms joining distinct segments of the alkylene groups, each such segment having at least 2 carbon atoms. Such alkylene or oxaalkylene groups are obtainable by replacing the ethylene glycol with other glycols or diols as mentioned in the aforesaid application Ser. No. 703,348, now U.S. Pat. No. 4,097,677.

The anaerobic adhesive compositions of the present invention include single-package systems stable when stored in partially-filled containers having oxygen or air above the liquid. They are characterized by a combination of properties enhancing their usefulness. Thus, they have low odor, low volatility, low toxicity, low viscosity and low shrinkage on cure; surprisingly, they are even effective to bond surfaces having a film of oil or grease thereon, though it is preferable to remove any rust and/or oil and grease.

In addition to single-package systems just mentioned, the adhesive compositions of the present invention include two-package systems wherein an amine or imide accelerator component (d) is provided in one package and component (c), namely the peroxide is supplied in the other. In this system the first-mentioned package or the second-mentioned package may contain all or portions of Formula I monomer (a), the polymerization inhibitor (component (b)), an adhesion enhancer (e), or a thickener, a filler, a reinforcing resin, a plasticizer. The second package containing the peroxide may contain any of the components just mentioned whether or not a portion of one or more of these components are present in the first package, but components (c) and (d) must not be present together in either of the two packages. In applying the two-package system, the composition in one package is applied to one or more of the surfaces to be joined and the composition in the other package is then applied to the other surfaces to be adhered to the first. If desired, the first composition may be applied to all the surfaces to be joined and then the second composition may be overcoated on the first. In any event surfaces bearing coatings of both packages are placed in contact wherever juncture and bonding is desired. The adhesive compositions of the present invention have the property termed "rapid fixturing" so that the structural elements to be joined need be clamped for only a short time (1 to 5 minutes) before sufficient setting occurs to allow release of the clamping pressure.

The use of a dicyclopentenyloxyethyl (meth)acrylate as the component (a) in the adhesive compositions of the present invention provides improved anaerobic adhesives of both single-package and two-package types characterized by low odor, low volatility, and low toxicity. They also exhibit low shrinkage, about 10% or less, on setting, and unusually rapid setting or "rapid structuring".

The adhesives of the present invention may be used to fixedly join threaded or unthreaded parts, such as of metals, especially those of the "transition metal" group of the Periodic Table, e.g. iron, nickel, cobalt, etc., whereby one or more of the surfaces to be joined provide an accelerating effect upon the polymerization which cures the sealant upon exclusion of oxygen. For the bonding of other materials, e.g. glass, plastics, or metals that are less active catalytically, e.g. cadmium, zinc, certain high alloy steels, electrically anodized aluminum, etc., it is generally desirable to pretreat these surfaces with a degreasing agent, and/or a primer containing amine or transition metal salt accelerators, and the disclosure thereof found in column 3, line 71, to column 4, line 14, of U.S. Pat. No. 3,642,750 is incorporated herein by reference.

In use, small amounts of the adhesive compositions of the invention hardenable on exclusion of oxygen are applied, as by dipping, brushing, or spraying, to the surfaces to be joined together. These surfaces are joined in such a way that air or oxygen is excluded from the joint. After a short period of time, of, for example, from ½ to 3 hours at ambient temperature an adhesive bond is obtained, which bond attains its ultimate strength after about 4 to 48 hours. If desired, the hardening process can be accelerated by heating the junction.

The adhesives or sealing agents according to the invention find technical application for the fixing of cap screws in their threaded receiving bores, sealing screwed joints, fixed jointed parts, e.g., a hub on a shaft, or sealing flanges to a pipe or rod. The adhesive compositions of the invention may particularly be utilized in the bonding or sealing of parts on such machines and devices which operate at high temperatures or which undergo a temperature increase in operation. The adhesive compositions of the invention are particularly useful in the automotive and electrical industry as well as in bonding parts in wrapping machines which lay down melted adhesives.

The anaerobic adhesives of the invention, especially the single-package type described herein, are thus useful in the fields of auto repair, machinery repair, industrial and automotive assembly. In most of these applications, they perform a similar task, namely locking threaded or unthreaded coaxial components, e.g. nuts and bolts; studs, fittings, hubs, and flanges to pipes, tubes, shafts, and axles, etc. They are also useful for making gaskets and seals in situ.

The two-package version of the adhesive invention provides a storage-stable rapid fixturing structural adhesive for adhering structural elements to form a juncture or joint capable of transmitting a reasonable stress without loss of structural integrity. The performance in this respect is generally evaluated by measurement of shear strength in tension.

The following examples, in which the parts and percentages are by weight unless otherwise stated, are illustrative of the present invention:

EXAMPLE 1

One hundred grams of dicyclopentenyloxyethyl methacrylate (DCPOEM), containing 0.005 g. of the methyl ether of hydroquinone as stabilizer, are mixed with 3.5 g. of cumene hydroperoxide and 2.0 g. of tributylamine. The mixture when stored in a polyethylene bottle remains fluid for months.

Carbon steel nuts and bolts are degreased by soaking them in perchloroethylene and then wiping them clean with cotton gauze. The threads of the bolts are coated with the above adhesive mixture and the nuts slipped over the threads. The initial locking time is about 1 hour, determined by periodically attempting to turn the nut by hand. The strength of the locking action is 31 Newton-meters (N-m), determined with a torque wrench after a 24 hr. cure time at room temperature.

EXAMPLE 2

97.7 g. of DCPOEM are mixed with 2 g. of cumene hydroperoxide and 0.3 g. benzoic sulfimide. The mixture is applied to degreased carbon steel bolts and also to the same type of bolt without degreasing. The mixture is further applied to degreased brass and degreased stainless steel bolts. Nuts corresponding to the bolts are slipped over the wet threads. After allowing 24 hours for curing at room temperature, the torque required to remove the respective nuts are as follows:

carbon steel, degreased: 35 N-m
carbon steel, not degreased: 27 N-m
stainless steel, degreased: 29 N-m
brass, degreased: 45 N-m

EXAMPLE 3

Ninety grams of DCPOEM, 10 g. of beta-acryloxypropionic acid (AOP-acid), 3.5 g. of cumene hydroperoxide and 2.0 g. tributylamine are mixed. The AOP-acid, which contains 0.093% hydroquinone and 0.066% methyl ether of hydroquinone, is added to the mixture as an adhesion promoter. When tested as in Example 1 this mixture requires a torque of 52.5 N-m to loosen the nut.

EXAMPLE 4

The procedure of Example 1 is followed except that dicyclopentenyloxyethyl acrylate (DCPOEA) is substituted for DCPOEM. The torque required to remove the nut is 5.6 N-m.

EXAMPLE 5

A storage-stable, 2-part structural adhesive is prepared as follows:
(a) 20 parts by weight of dicyclopentenyloxyethyl methacrylate is mixed with 2 parts of Cab-O-Sil M-5 fumed silica as a thickener and 0.5 part of bis-hydroxyethyl toluidine as a cure accelerator.
(b) 4 parts of a low molecular weight poly(methyl acrylate) available under the registered trademark ACRYLOID® C-10-LV is mixed with 1 part of benzoyl peroxide polymerization initiator pre-dissolved in 6 parts of benzene.

Strips of thin stainless steel are fastened together with this adhesive as follows: One side of each of two strips is painted with part (b) and allowed to dry. Part (a) is then spread thinly over part (b) on one of the strips. The treated sides of the two strips are then brought in contact. The assembly is then clamped under 130 kilopascals (kPa) for 15 min. at room temperature. Tensile shear measurements are made according to Method D-1002-72 of the American Society for Testing and Materials. Tensile shear strengths of 5800 kPa are obtained within 15 min. after unclamping the joined strips.

EXAMPLE 6

The procedure of Example 5 is followed except a portion (2 parts by weight) of the dicyclopentenyloxyethyl methacrylate is replaced by 2 parts of beta-acryloxypropionic acid as an adhesion enhancer or promoter. A tensile shear strength of 6900 kPa is obtained.

EXAMPLE 7

A storage-stable 2-part structural adhesive is made as follows:
(a) 18 parts by weight of dicyclopentenyloxyethyl methacrylate is blended with 2 parts of acryloxypropionic acid as adhesion promoter, 2 parts of Cab-O-Sil M-5 fumed silica as a thickener, and 0.4 part of bis-hydroxyethyl toluidine as a cure accelerator.
(b) 10 parts of methylene chloride as solvent, 6 parts of Acryloid C-10-LV, 2 parts of acryloxypropionic acid, and 2 parts of benzoyl peroxide as a polymerizing initiator are mixed.

Wood, cold rolled steel and stainless steel strips are fastened with the above adhesive and tested according to the procedure of Example 5. Tensile shear strengths are found as follows:

| Adherend | Tensile Shear Strength (kiloPascals) |
|---|---|
| Wood | 8,800 |
| Cold rolled steel | 23,000 |
| Stainless steel | 7,800 |

EXAMPLE 8

A storage-stable, 2-part adhesive is made as follows:

(a) 20 parts by weight of dicyclopentenyloxyethyl methacrylate, 2 parts of Cab-O-Sil M-5 fumed silica and 0.4 part of benzoyl peroxide predissolved in 2.4 parts of benzene are mixed.

(b) 8 parts of dicyclopentenyloxyethyl methacrylate and 2 parts of bis-hydroxyethyl toluidine are mixed.

Part (b) is painted onto each of two surfaces of wood to be joined. Part (a) is then spread over one of the coated surfaces. The treated surfaces are then mated, clamped and tested as in Example 5. A tensile shear strength of 12,750 kPa is obtained.

EXAMPLE 9

A storage-stable, 2-part adhesive is made as follows:
(a) 15 parts by weight of dicyclopentenyloxyethyl acrylate is mixed with 3 parts of Cab-O-Sil M-5 fumed silica and 0.53 part of benzoyl peroxide predissolved in 3.2 parts of benzene.

(b) 15 parts of dicyclopentenyloxyethyl acrylate is mixed with 2.5 parts of Cab-O-Sil M-5 and 0.53 part of bis-hydroxyethyl toluidine predissolved in 1 part of benzene.

Part (a) is spread on a surface of one strip of wood and part (b) is similarly spread on another strip. The treated surfaces are mated, clamped and tested as in Example 5. A tensile shear strength of 1.375 kPa is obtained.

EXAMPLE 10

A 1-part adhesive, which is not storage-stable, is made by mixing equal parts of (a) and (b) described in Example 9. The mixture is quickly spread on wood surfaces which are then mated, clamped and tested as in Example 5. A tensile shear strength of 1,650 kPa is obtained.

EXAMPLE 11

A stable, 2-part structural adhesive is prepared as follows:
(a) 20 parts by weight of dicyclopentenyloxyethyl methacrylate is mixed with 10 parts of a polyester resin made from maleic anhydride and propylene glycol, 0.6 part of bis-hydroxyethyl toluidine and 1.5 parts of Cab-O-Sil M-5 fumed silica thickener.

(b) 10 parts by weight of benzoyl peroxide is mixed with 40 parts of Acryloid C-10LV and 50 parts of methylene chloride.

Part (b) is painted onto each of two surfaces of cold rolled steel to be joined. Part (a) is then spread over one of the coated surfaces. The treated surfaces are then mated, clamped and tested as in Example 5. A tensile shear strength of 2,240 kPa is obtained.

EXAMPLE 12

The procedure of Example 11 is followed except the dicyclopentenyloxyethyl methacrylate is replaced by its acrylate analog. A tensile shear strength of 2,200 kPa is obtained.

EXAMPLE 13

Three anaerobic adhesive mixtures are prepared by mixing the ingredients listed as follows:

| Ingredient | PARTS BY WEIGHT | | |
|---|---|---|---|
| Adhesive Mixture | A | B | C |
| Dicyclopentenyloxyethyl methacrylate | 100 | 90 | — |
| Dicyclopentenyl methacrylate | — | — | 100 |
| Trimethylol propane triacrylate | — | 10 | — |
| Cumene hydroperoxide | 2.0 | 2.0 | 2.0 |
| o-Benzoic sulfimide | 0.3 | 0.3 | 0.3 |

The threads of several degreased carbon steel bolts are coated with each of the adhesive mixtures, A, B and C, and degreased carbon steel nuts are slipped over the threads short of contact with the heads of the bolts. After a period of twenty-four hours, half of the nuts and bolts fastened with each adhesive are heated in an oven at 115° C. for 1 hr. The other half are maintained at room temperature. The torque required to disassemble the nuts and bolts, the adhesive mixture applied to which is cured at room temperature and at elevated temperature, respectively, is as follows:

| Adhesive Mixture | Torque (N-m) | |
|---|---|---|
| | Room Temperature | 115° C. |
| A | 29.4 | 3.4 |
| B | 25.4 | 28.3 |
| C | 29.4 | 49.7 |

EXAMPLE 14

Two anaerobic adhesive mixtures are prepared by mixing the ingredients listed as follows:

| Adhesive Mixture | Parts By Weight | |
|---|---|---|
| | A | B |
| Dicyclopentenyloxyethyl methacrylate | 90.0 | — |
| Dicyclopentenyl methacrylate | — | 90.0 |
| β-Acryloxypropionic acid | 10.0 | 10.0 |
| Cumene hydroperoxide | 3.5 | 3.5 |
| Tributylamine | 2.0 | 2.0 |

The threads of several degreased carbon steel bolts are coated with each of the mixtures, A and B, and the coated bolts are weighed. Degreased carbon steel nuts are slipped over the threads of half of the bolts coated with each adhesive mixture, the adhesive mixture is allowed to cure at room temperature for one day, and the torque required to disassemble the nuts and bolts is determined. The results are presented in the table below.

The remaining half of the coated bolts are stored for 19 days under ambient conditions. At the end of this period, the loss of adhesive due to evaporation is determined by weighing the coated bolts and subtracting the weight of the coated bolts following storage from the weight of the bolts upon initially being coated. Degreased carbon steel nuts are slipped over the threads of the bolts coated with each adhesive mixture, the adhesive mixture is allowed to cure at room temperature for one day, and the torque required to disassemble the nuts and bolts is determined. The results are presented in the table below.

| | Adhesive Mixture | | | | | |
|---|---|---|---|---|---|---|
| | A | | | B | | |
| | Initial | Post-storage | % Change | Initial | Post-storage | % Change |
| weight of adhesive (g) | 0.104 | 0.104 | 0 | 0.091 | 0.055 | 40 |
| torque (N-m) | 50 | 35 | 30 | 46 | 21 | 55 |

What is claimed is:

1. A spreadable fluid adhesive and/or sealing composition hardenable under exclusion of oxygen comprising, as its essential components:
   (a) Liquid dicyclopentenyloxyethyl acrylate or methacrylate, or a mixture thereof as the main component,
   (b) From 0 to 0.1% by weight of a polymerization inhibitor serving to stabilize the composition while stored in the presence of oxygen,
   (c) From about 0.1 to 20% by weight of an organic percompound having 3 to 18 carbon atoms selected from the group consisting of organic peroxides, which are half-decomposed after 10 hours at temperatures above 90° C., and organic hydroperoxides as a polymerization initiator, effective under exclusion of oxygen, and
   (d) From about 0.1 to 5% by weight of an accelerator, the aforesaid percentages being based on the total weight of the components (a), (b), (c) and (d).

2. A composition according to claim 1 wherein component (c) is an organic hydroperoxide.

3. A composition according to claim 1 further including up to 15% by weight, based on amount of component (a), of a compound selected from the group consisting of beta-acryloxypropionic and beta-methacryloxypropionic acids to enhance adhesion.

4. A composition according to claim 1 in which the amount of component (a) is at least 75% by weight of the total weight of components (a), (b), (c), and (d) and the composition contains from 0.001% to about 0.1% by weight of component (b).

5. a composition according to claim 4 wherein component (b) comprises the methyl ether of hydroquinone, (c) is cumene hydroperoxide, and (d) is tributylamine.

6. A composition according to claim 1 wherein component (d) contains a tertiary amine or an imide.

7. A composition according to claim 1 which may also include a thickener, an inorganic filler, a reinforcing resin or a dye, a plasticizer, or an adhesion-enhancer.

8. A composition according to claim 3 which may also include a thickener, an inorganic filler or a dye, or a plasticizer, the weight percentage of the entire amount of such additional materials being less than 40% by weight of the resulting composition, and preferably being not over 15% by weight thereof.

9. A composition according to claim 3 wherein (c) is cumene hydroperoxide and (d) is benzoic sulfimide.

10. A composition according to claim 3 wherein (c) is cumene hydroperoxide and (d) is tributyl amine.

* * * * *